United States Patent [19]

Blount

[11] Patent Number: 4,859,713

[45] Date of Patent: Aug. 22, 1989

[54] PRODUCTION OF FLAME-RETARDANT POLYOLS

[76] Inventor: David H. Blount, 6728 Del Cerro Blvd., San Diego, Calif. 92120

[21] Appl. No.: 131,125

[22] Filed: Dec. 4, 1987

Related U.S. Application Data

[63] Continuation-in-part of Ser. No. 60,492, Jun. 11, 1987, and a continuation-in-part of Ser. No. 64,502, Jun. 22, 1987.

[51] Int. Cl.$^4$ .................................................. C08J 9/14
[52] U.S. Cl. .................................. 521/106; 521/107; 521/108; 521/156; 521/168
[58] Field of Search ............... 521/106, 107, 108, 156, 521/168

[56] References Cited

U.S. PATENT DOCUMENTS 4,743,624  5/1988  Blount ................................. 521/106

Primary Examiner—Morton Foelak

[57] ABSTRACT

Flame-retardant polyols are produced by chemically reacting an epoxy compound, a phosphorus-containing compound and a compound containing 1 or more active hydrogens to produce a phosphorus-containing polyol with acid radicals which are reacted with an alkali compound. The flame-retardant polyol will react with polyisocyanates to produce solid or foamed products which may be used as coating agents, adhesive or for insulation.

16 Claims, No Drawings

PRODUCTION OF FLAME-RETARDANT POLYOLS

CROSS-REFERENCE TO RELATED APPLICATIONS

This is a continuation-in-part of U.S. patent application Ser. No. 060,492, filed June 11, 1987, and Ser. No. 064,502, filed June 22, 1987.

BACKGROUND OF THE INVENTION

This invention relates to the production of flame-retardant polyols. The inorganic-organic flame-retardant polyols are produced by mixing and reacting an epoxy compound, a phosphorus-containing compound and a compound containing one or more reactive hydrogen atoms that will react with an epoxy compound or phosphorus-containing compound to produce a polyol which contains free phosphorus acid radicals which are reacted with a basic salt-forming compound. Free phosphorus-containing compounds are present in the polyol which are reacted with the basic salt-forming compound to produce inorganic flame-retardant agents.

In the process of U.S. patent application Ser. Nos. 060,492 and 060,502, an inorganic flame-retardant agent is produced and is used in the form of an inorganic flame-retardant agent polyol emulsion in the production of polyurethane and polyester products. In the process of this invention, the phosphorus-containing compound is a part of the polyol compound by reacting it with the epoxy compound and/or the compound containing one or more active hydrogens. The phosphorus-containing compound may also act as the catalyst in the chemical reactions. An excess of the phosphorus-containing compound may be used and inorganic flame-retardant agents are also produced which are in the form of very small particles and are well distributed in the product which makes it an effective and inexpensive flame-retardant agent. This combination of phosphorus-containing polyols containing emulsified inorganic flame-retardant agents makes a very effective and inexpensive flame-retardant polyol which is useful in the production of polyurethane and polyester products.

While not wishing to be bound by any theory of operation, it appears that the basic salt-forming compound and the acidic phosphorus salt-forming compound chemically react in the inorganic-organic polyol liquid, and a much smaller particle is produced which is well distributed in the product and only takes a small amount, such as 2 percent to 10 percent by weight of the flame-retardant agent, to be an effective and inexpensive flame-retardant agent. It takes as much as 3 to 10 times as much more of the phosphorus-containing salt not produced in a polyol. In some reactions, a small amount of water is beneficial in speeding up the reaction and also is beneficial in flame-retardation. A small amount of water is chemically bound to the flame-retardant agent. An amount of water equal to the amount of the phosphorus-containing compound is usually sufficient. An excess should be avoided.

SUMMARY OF THE INVENTION

Inorganic-organic flame-retardant polyols are produced by mixing and reacting the following components:

Component A: epoxy;
Component B: compound containing 1 or more reactive hydrogens;
Component C: acidic salt-forming compound that contains phosphorus;
Component D: basic salt-forming compound that will react with a phosphorus-containing compound.

COMPONENT A

Any suitable epoxy compound may be used in this invention. The epoxy compound may contain 1 or more epoxy radicals, may be saturated or unsaturated or be substituted. The epoxy compounds are well known in the Arts. The mono-epoxy compounds are preferred, but are not limited to ethylene oxide, propylene oxide, epihalohydrins, butylene oxide, tetrahydrofuran, styrene oxide and mixtures thereof. Mixtures of polyepoxy and mono-epoxy compounds may be used. Typical polyfunctioning epoxy compounds include epichlorohydrin, glycidol, methyl epichlorohydrin, 1,2-epoxybutane, 1,2-epoxycyclohexane, epoxyethane, 1,2-epoxypropane, 1,chloro-2,3-epoxypropane, 1:2, 3:4-diepoxybutane, 2:3, 6:7-diepoxy-2,6-dimethyl-4-octene, epoxyethylbenzene, epoxidized polyhydroxy compounds, epoxidized oils, epoxidized unsaturated organic compounds, epoxidized unsaturated fatty acid, phenoxy resins, epoxidized phenol-formaldehyde resin, epoxidized Bisphenol A and diglycidyl ether of bisphenol, trichlorobutylene oxide, etc., and mixtures of the above. Various examples of polyepoxides that may be used in the process of this invention are given in U.S. Pat. No. 2,633,458, and it is to be understood that much of the disclosure of that Patent which is relative to examples of polyepoxides is incorporated by reference into this specification.

Epihalohydrins or any alpha-chloro-beta, gamma epoxy organic compounds, e.g., epichlorohydrin, may be used in this invention.

Any suitable epihalohydrin in compound may be used in invention such as epichlorohydrin, epibromohydrin, methyl epichlorohydrin, di-epi-iodohydrin and mixtures thereof. Epichlorohydrin is the preferred epihalohydrin.

Instead of epichlorohydrin, other compounds of the following general formula:

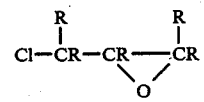

where R is the same or different organic radicals or hydrogen. Preferably, the R groups contain no strong acidic groups such as sulphonic acid groups, but any organic radicals may be used since the R groups are not important. It is important that the chloro and epoxy groups be in the position indicated. The R groups, may for example, be $CH_3-$, $C_2H_5-$, $C_3H_7-$, $C_5H_4-$, $C_8H_{17}-$, $C_{10}H_{21}-$, phenyl, benzyl, tolyl, xylyl, pyridyl, furyl, etc., may be used in this invention. Among these some examples are:

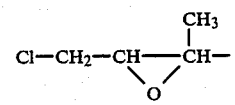

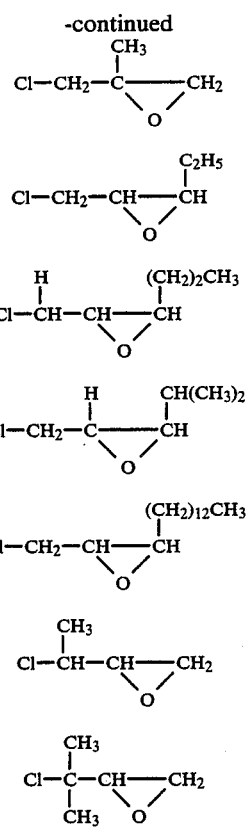

COMPONENT B

Any suitable compound containing reactive hydrogen that will react with an epoxy compound and/or an acidic salt-forming compound that contains phosphorus may be used in this invention. The epoxides may be polymerized with themselves in the presence of a Lewis acid such as $BF_3$ or by addition of other epoxides, optionally as mixtures or successively, to starting components which contain reactive hydrogen atoms such as thiols, carboxyl groups, alcohols, or amines, e.g., water, ethylene glycol, propylene-1,-3 or -2,-2-glycol, trimethylolpropane, 4,4'-dihydroxydiphenylpropane, aniline, ammonia, ethanolamine, ethylenediamine, sucrose, monohydric phenols, polyhydric phenols, polyols, vinyl polymers with free OH radicals or reactive hydrogen, pentaerythritol, sorbitol, methyl glucoside, diethylenetriamine, etc., and mixtures thereof.

Phosphorus-containing compounds usually contain sufficient water or reactive hydrogen to react with the epoxy radicals; therefore, other compounds of Component B may or may not be used.

COMPONENT C

Any suitable acidic salt-forming compound that contains phosphorus and will react with the epoxy compound, a compound with 1 or more reactive hydrogens and/or the basic salt-forming compound may be used in this invention. Any suitable phosphorus-containing compound may be used in this invention. Phosphorus-containing compounds include, but are not limited to, phosphoric acid, phosphinic acid, phosphinous acid, phosphine oxide, phosphorus trichloride, alkylchlorophosphines, organic acid phosphates, phosphorus oxychloride, monoaluminum phosphate, hydrogen-containing salts of phosphoric acid, hypophosphorus acid, and mixtures thereof.

Phosphoric acid is the preferred acidic-salt-forming compound.

COMPONENT D

Any suitable compound that will react with a phosphorus compound to form a salt may be used in this invention. Suitable compounds include alkali metal compounds, alkaline earth metal compounds, metal compounds, ammonium compounds and mixtures thereof. These compounds are preferable in a fine powder form. An excess amount of these compounds may be used and utilized as a reactant and filler. It is preferable to use natural mineral products when available, to reduce the cost. Salts of acids stronger than phosphoric acid are not suitable. Suitable alkali metal compounds include compounds which contain sodium, potassium, lithium, rubidium and cessium. These compounds may be in the form of alkali metal, but are not limited to, oxides, hydroxide, carbonates, salts of organic acids, bicarbonates, natural minerals, silicates, etc.

Suitable alkaline earth metal compounds and mixtures thereof include compounds which contain calcium, strontium, magnesium and barium. These compounds may be in the form of alkaline earth metal, but are not limited to metals, oxides, hydroxides, carbonates, salts of organic acids, natural minerals, silicates, etc., and mixtures thereof.

Suitable metal compounds include compounds which contain baryllium, copper, zinc, titanium, zirconium, lead, arsenic, antimony, bismuth, molybdenum, tungsten, manganese, iron, nickel and cobalt. Suitable metal compounds include, but are not limited to, metals, oxides, hydroxides, carbonates, salts of organic acids, natural minerals, silicates, etc., and mixtures thereof.

Suitable ammonium compounds include, but are not limited to, compounds which contain ammonium radical, such as ammonia, amino compounds, e.g., urea, alkylureas, cicyandiamide, melamine, guanidine, aminoguanidine; amines, e.g., aliphatic amines, aromatic amines; organic ammonium salts, e.g., ammonium acetate, ammonium oxoalate, etc., ammonium carbonate, quaternary ammonium hydroxide, ammonium silicate, and mixtures thereof.

The chemical reaction of this invention may take place under any suitable conditions. Usually ambient temperature and pressure are satisfactory, but in certain reactions, elevated temperature and/or elevated pressure are preferred. In certain reactions, it is necessary to cool the reaction vessel and when the component is a gas, it is necessary to elevate the pressure.

The preferred process to produce inorganic-organic flame-retardant polyols is to add Components A, B and C and agitate until the chemical reaction is complete. The reactions are usually complete within 12 hours to produce a mixture of inorganic-organic polyol with free acidic phosphate radicals and the compound containing phosphorus. To this mixture, a basic salt-forming compound is added to react with any unreacted phosphate compound or free acidic radicals, thereby producing a salt of inorganic-organic phosphate polyol. An excess of the basic salt-forming compound may be used as a filler. The reaction is complete within 12 hours.

The components may be mixed and reacted simultaneously when the basic salt-forming compound is slow to react with the phosphorus-containing compound, thereby giving time for the phosphorus-containing compound to react with the epoxy compound. The acid phosphorus compound is a Lewis acid and acts as a catalyst to promote the polymerization of the epoxy radicals. Ethylene oxide will react in a closed system under pressure of 50 to 100 psi at an elevated temperature up to 250° C. while agitating.

The salt of inorganic-organic polyol is flame-retardant, but when destroyed by fire, a phosphate salt is found in the residue and probably eliminates the possible polypropylene oxide phosphate hazard.

The proportions of the reactants and other compounds used in this invention to produce the inorganic-organic polyol with free phosphate acid radicals or salt of inorganic-organic polyol may vary within the following ratio:

(a) Component A—100 parts by weight of the epoxy compound;
(b) Component B—up to 100 parts by weight of the compound containing 1 or more reactive hydrogens;
(c) Component C—1 to 30 parts by weight of an acidic salt-forming compound that contains phosphorus;
(d) Component D—up to 100 parts by weight of a basic salt-forming compound;
(e) up to 20% by weight of an emulsifying agent, percentage based on weight of reactive mixture;
(f) up to 300% by weight of modifying compound, percentage based on reactive mixture;
(g) up to 10% by weight of an epoxy catalyst, percentage based on reactive mixture.

Any suitable compound that contains at least one active hydrogen, preferably 2 or more active hydrogen-containing compounds that will react with isocyanate radical may be used in this invention with the products of this invention to produce polyurethane products.

The organic compounds having reactive hydrogens are understood to be not only compounds which contain amino groups, thiol groups or carboxyl groups, but particularly also polyhydroxyl compounds and especially those which contain two to eight hydroxyl groups and which have a molecular weight of about 800 to about 10,000, preferably about 1,000 to 6,000, e.g., polyesters, polyethers, polythioethers, polyacetals, polycarbonates and polyester amides which contain at least 2, generally 2 to 8 and preferably 2 to 4 hydroxyl groups and at least one ionic or non-ionic hydrophilic group, of the kind which are known, per se, for producing both homogeneous and cellular polyurethanes.

Any suitable polyesters with at least one hydroxyl group may be used to make Component C, including, e.g., reaction products of polyhydric, preferably dihydric alcohols with the optional addition of trihydric alcohols, and polybasic, preferably dibasic carboxylic acids. Instead of free polycarboxylic acids, the corresponding polybarboxylic acid anhydrides or corresponding polycarboxylic acid esters of lower alcohols or their mixtures may be used for producing the polyesters. The polycarboxylic acids may be aliphatic, cycloaliphatic, aromatic and/or heterocyclic and may be substituted, e.g., with halogen atoms, and/or unsaturated. The following are examples: succinic acid, adipic acid, suberic acid, azelaic acid, sebasic acid, phthalic acid, isophthalic acid, trimellitic acid, phthalicacid anhydride, tetrahydrophthalic acid anhydride, hexahydrophthalic acid anhydride, tetrachlorophthalic acid anhydride, indomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethyl terephthalate and bisglycol terephthalate. Suitable polyhydric alochols include, e.g., ethylene glycol, propylene-1,2- and -1,3-glycol, butylene-1,4- and -2,3-glycol, hexane-1,6-diol, octane-1,8-diol, neopentyl glycol, cyclohexane dimethanol (1,4-bis-hydroxy-methyl cyclohexane). 2-methyl-1,3-propanediol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl groups in end positions. Polyesters of lactones such as $\epsilon$-caprolactone or hydroxycarboxylic acids such as $\omega$-hydroxycaproic acid may also be used.

Any suitable hydroxyl polyether with at least one, generally two to eight and preferably two to three hydroxyl groups which may be used to make Component C according to the invention are also known, per se, and may be prepared, e.g., by polymerizing epoxides such as ethylene oxide, propylene oxide, propylene oxide, butylene oxide tetrahydrofuran, styrene oxide or epichlorohydrin, each with itself, e.g., in the presence of $BF_3$, or by addition of these epoxides, optionally as mixtures or successively, to starting components which contain reactive hydrogen atoms such as alcohols or amines, e.g., water, ethylene glycol, propylene glycol-(1,3) or -(1,2), trimethylolpropane, 4,4'-dihydroxydiphenylpropnane, aniline, ammonia, ethanolamine, or ethylene diamine. Sucrose polyethers such as those described, e.g., in German Auslegeschrift Nos. 1,176,358 and 1,064,938, may also be used according to the invention. It is frequently preferred to use polyethers which contain predominantly primary OH-groups (up to 90% by weight, based on all the OH-groups in the polyether). Polyethers modified with vinyl polymers of the kind which can be obtained, e.g., by polymerizing styrene or acrylonitrile in the presence of polyethers (U.S. Pat. Nos. 3,383,351; 3,304,273; 3,523,092 and 3,110,695 and German patent specification No. 1,152,536), and polybutadienes which contain OH-groups are also suitable.

Suitable polythioethers are, in particular, the condensation products of thiodiglycol with itself and/or with other glycols, dicarboxylic acids, formaldehyde, aminocarboxylic acids or amino alcohols. The products obtained are polythio-mixed ethers, polythioether esters or polythioether ester amides, depending on the co-component.

Suitable polyacetals are, e.g., the compounds which can be prepared from glycols such as diethylene glycol, triethylene glycol, 4,4'-dioxethoxy-diphenyl dimethylmethane, hexanediol and formaldehyde. Polyacetals suitable for the invention may also be prepared by polymerizing cyclic acetals.

Suitable polycarbonates with hydroxyl groups are of the kind known, per se, which can be obtained, e.g., by reacting diols such as propane-1,3-diol, butane-1,4-diol and/or hexane-1,6-diol or diethylene glycol, triethylene glycol or tetraethylene glycol with diaryl carbonates such as diphenyl carbonate or phosgene.

The polyester amides and polyamides also include the predominantly linear condensates obtained from polyvalent saturated and unsaturated carboxylic acids or their anhydrides and polyvalent saturated and unsaturated amino alcohols, diamines, polyamines and mixtures thereof.

Polyhydroxyl compounds which already contain urethane or urea groups may also be used, as well as modified or unmodified natural polyols such as castor oil, carbohydrates or starch. Additional products of alkylene oxides to phenol-formaldehyde resins or to urea-formaldehyde resins may also be used according to the invention.

Representatives of these compounds which may be used according to the invention have been described, e.g., in High Polymers, Volume XVI, "Polyurethanes, Chemistry and Technology", published by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII; Vieweg-Hochtlen, Carl-Hanser-Verlag, Munich, 1966, e.g., on pages 45 to 71.

Silicone compounds which contain free hydroxyl or amine groups may be used in this invention, e.g., silicone, polyols.

Any suitable compound that contains at least 2 isocyanate groups may be used in this invention.

Any suitable organic polyisocyanate may be used as starting Component A, including aliphatic, cycloaliphatic, araliphatic, aromatic or heterocyclic polyisocyanates of the kind described, e.g., by W. Siefken in Justus Liebigs Annalen der Chemie, 562, pages 75 to 136, for example, ethylene diisocyanate, tetramethylene-1,4-diisocyanate, hexamethylene-1,6-diisocyanate, hexamethylene-1,6-diisocyanate, dodecane-1,12-diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane (DAS No. 1,202,785), hexahydrotolylene-2,4- and -2,6-diisocyanate and any mixtures of these isomers, hexahydrophenylene-1,3- and/or -1,4-diisocyanate, perhydrodiphenylmethane-2,4'- and/or 4,4'-diisocyanate, phenyl-1,3- and -1,4-diisocyanate, tolylene-2,4- and -2,6-diisocyanate and any mixtures of these isomers, diphenylmethane-2,4' and/or -4,4'-diisocyanate, naphthylene-1,5-diisocyanate, triphenylmethane-4,4/,4"-triisocyanate, polyphenyl-polymethylene-polyisocyanates, which can be obtained by aniline-formaldehyde concensation followed by phosgenation and which have been described, e.g., in British patent specification Nos. 874,430 and 848,671, perchlorinated aryl polyisocyanates as described, e.g., in U.S. Pat. No. 3,277,138, polyisocyanates which contain carbodiimide groups as described in U.S. Pat. No. 3,152,162, diisocyanates of the kind described in U.S. Pat. No. 3,492,330, polyisocyanates which contain allophanates groups as described, e.g., in British patent specification No. 994,890, Belgian patent specification No. 761,626 and published Dutch patent application No. 7,102,524, polyisocyanates which contain isocyanurate groups as described, e.g., in German patent specification Nos. 1,022,789; 1,222,067 and 1,027,394 and in German Offenlegungsschrift Nos. 1,929,034 and 2,004,048, polyisocyanates which contain urethane groups as described, e.g., in Belgian patent specification No. 752,261 or in U.S. Pat. No. 3,392,164, polyisocyanates which contain acylated urea groups according to U.S. Pat. No. 3,517,039, polyisocyanates which contain biuret groups as described, e.g., in U.S. Pat. No. 3,124,605, in British patent specification No. 889,050 and in U.S. Pat. application Ser. No. 036,500, filed May 11, 1970, now abandoned, polyisocyanates prepared by telomerization reactions as described, e.g., in Belgian patent specification No. 723,640 polyisocyanates which contain ester groups of the kind mentioned, e.g., in British patent specification Nos. 956,474 and 1,072,956, in U.S. Pat. No. 3,567,763 and in German patent specification No. 1,231,688, and reaction products of the above-mentioned isocyanates with acetals according to U.S. Pat. No. 3,120,502.

The distillation residues which are obtained from the commercial production of isocyanates and which still contain isocyanate groups may also be used, if desired, dissolved in one or more of the above-mentioned polyisocyanates. Any mixtures of the above-mentioned polyisocyanates may also be used.

It is generally preferred to use commercialy readily available polyisocyanates such as tolylene-2,4- and -2,6-diisocyanate and any mixtures of these isomers ("TDI"), polyphenyl-polymethylene polyisocyanates which are obtained by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

It is particularly preferred, however, to use polyisocyanates which are obtained by phosgenating aniline-formaldehyde condensates.

Reaction products of about 50 to 99 mols of aromatic diisocyanates with about 1 to 50 mols of compounds which contain at least 2 hydrogen atoms capable of reacting with isocyanate and which generally have a molecular weight of about 400 to about 10,000 may also be used.

The flame-retardant polyurethane products may be produced under any suitable physical condition. The components may be mixed in any suitable manner. They may be mixed simultaneously, at ambient temperature and pressure. The optional component may be added to the mixture. Optional components include initiator, filler, dilutent, blowing agent, emulsifying agent, foam stabilizier, modifying compounds, etc.

The proportions of the reactants and other compounds used in this invention to produce flame retardant polyurethane products may vary within the following ratios:
(a) 1 to 200 parts by weight of a compound containing at least 2 isocyanate radicals;
(b) 1 to 50 parts by weight of the inorganic-organic polyol with acid phosphate radicals or salt of inorganic-organic phosphate polyol;
(c) up to 100 parts by weight of Component B;
(d) up to 50 percent by weight of an inert liquid, boiling in the range of −25° C. to 80° C.;
(e) up to 10 percent by weight of an activator;
(f) up to 20 percent by weight of foam stabilizer;
(g) up to 20 percent by weight of emulsifying agent;
(h) up to 300 percent by weight of inorganic or organic particulate or pulverulent material;
(i) up to 300 percent of a modifying compound.
Percentages are based on weight of the reaction mixture.

When producing foams by the process according to the invention, it is advisable to use blowing agents, even when using NCO-prepolymers which give rise to the evolution of carbon dioxide. The blowing agents which are suitable for for this purpose are inert liquids boiling within a range of −25° C. to +80° C. and preferably −15° C. to +40° C. They are preferably insoluble in the silicate solution and they are used in quantities of 0–50 percent by weight, preferably 2–30 percent by weight, based on the reaction mixture.

Suitable organic blowing agents are, e.g., acetone, ethyl acetate, methanol, ethanol, halogen-substituted alkanes such as methylene chloride, chloroform, ethylidene chloride, vinylidene chloride, monofluorotrichloromethane, chlorodifluoromethane or dichlorodifluoromethane, butane, hexane, heptane or diethyl ether. Substances which decompose at temperatures above room temperature to liberate gases such as azoisobutyric acid nitrile, may also act as blowing agents. Other examples of blowing agents and details concerning the use of blowing agents are described in Kunststoff-Handbuch, Volume VII, published by Vieweg and Hochtlen, Carl-Hanser-Verlag, Munich 1966, e.g., on pages 108 and 109, 453 to 507 to 510.

Catalysts which promote and activate the reaction of isocyanates with reactive hydrogen are also often used in catalytic amounts according to the invention. Catalysts known, per se, may be used, e.g., tertiary amines such as triethylamine, tributylamine, N-ethyl-morpholine, N-cocomorpholine, N,N,N',N'-tetramethyl-ethylene diamine, 1,4-diaza-bicyclo(2,2,2)-octane, N-methyl-N'-dimethylaminoethyl piperazine, N,N-dimethyl benzylamine, bis-(N,N-diethylaminoethyl)-adipate, N,N-diethyl benzylamine, pentamethyl diethylene triamine, N,N-dimethyl cyclohexylamine, N,N,N',N'-tetramethyl-1,3-butane diamine, M,N-dimethyl- -phenyl ethylamine, 1,2-dimethyl imidazole or 2-methyl imidazole.

Suitable tertiary amine catalysts with hydrogen atoms which are reactive with isocyanate groups include, e.g., triethanolamine, triisopropanolamine, N-methyl-diethanolamine, N,N-dimethyl-ethanolamine and their reaction products with alkylene oxides such as propylene oxide and/or ethylene oxide.

Silaamines which have carbon-silicon bonds as described, e.g., in German Patent Specification No. 1,229,290 may also be used as catalysts, e.g., 2,2,4-trimethyl-2-silamorpholine or 1,3-diethyl-aminomethyl-tetramethyl-disiloxane.

Bases which contain nitrogen, such as tetraalkyl ammonium hydroxides, alkali metal hydroxides such as sodium hydroxide, alkali metal phenolates such as sodium phenolate or alkali metal alcoholates such as sodium methylate may also be used as catalysts. Hexahydrotriazines are also suitable catalysts.

Organic metal compounds may also be used as catalysts according to the invention, particularly organic tin compounds.

The organic tin compounds used are preferably tin-(II) salts of carboxylic acids such as tin(II)-acetate, tin(II)-octoate, tin(II)-ethyl hexoate and tin(II)-laurate and the dialkyl tin salts of carboxylic acids such as dibutyl tin diacetate, dibutyl tin dilaurate, dibutyl tin maleate or dioctyl tin diacetate.

Other representatives of catalysts which may be used according to the invention and details concerning the action of the catalysts have been described in Kunststoff-Handbuch, Volume VII, published by Vieweg and Hochtlen, Carl-Hanser-Verlag, Munich 1966, e.g., on pages 96 to 102.

The catalysts are generally used in any catalytic amount, preferably in a quantity up to 10 percent by weight, based on the reaction mixture.

Surface-active additives (emulsifiers and foam stabilizers) may also be used according to the invention.

Suitable emulsifiers include, e.g., the sodium salts of ricinoleic sulphonates or of fatty acids or salts of fatty acids with amines such as oleic acid diethylamine or stearic acid diethanolamine. Alkali metal or ammonium salts of sulphonic acids, for example, of dodecyl benzene sulphonic acid or dinaphthyl methane disulphonic acid or of fatty acids such as ricinoleic acid or of polymeric fatty acids may also be included as surface-active additives.

The foam stabilizers used are mainly water-soluble polyether siloxanes. These compounds generally have a polydimethyl siloxane group attached to a copolymer of ethylene oxide and propylene oxide. Foam stabilizers of this kind have been described, e.g., in U.S. Pat. No. 3,629,308.

Reaction retarders, e.g., substances which are acid in reaction such as hydrochloric acid or organic acid halides, cell regulators known, per se, as paraffins or fatty alcohols or dimethyl polysiloxanes, pigments, dyes, flame-retarding agents known, per se, as trischloroethyl phosphate or ammonium phosphate and polyphosphate, stabilizers against aging and weathering, plasticizers, fungistatic and bacteriostatic substances and fillers such as barium sulphate, kieselguhr, carbon black or whiting may also be used according to the invention.

Other examples of surface-active additives, foam stabilizers, cell regulators, reaction retarders, stabilizers, flame-retarding substances, plasticisers, dyes, fillers and fungistatic and bacteriostatic substances which may also be used according to the invention and details concerning their use and mode of action have been described in Kunststoff-Handbuch, Volume VI, published by Vieweg and Hochtlen, Carl-Hanser-Verlag, Munich 1966, e.g., on pages 103 to 113.

Additives which even further improve the fire-retarding characteristics of these plastics are particularly important and therefore, it is preferred to include them. Apart from the usual flame-retarding agents, these include, in particular, halogenated paraffins and inorganic salts of phosphoric acid.

Production of foams according to the invention is basically carried out by mixing the above-described reactants in one or several stages in a discontinuously or continuously operating mixing apparatus and then leaving the mixture to foam up and solidify, in most cases outside the mixing apparatusin molds or on suitable supports. The required reaction temperature of between about 0° C. and 200° C., preferably between 30° C. and 160° C., can be achieved either by preheating one or more of the reactants before the mixing process or by heating the mixing apparatus itself or by heating the reaction mixture after it has been prepared. One may, of course, also use combinations of these or other methods for adjusting the reaction temperature. In most cases, sufficient heat is evolved during the reaction to enable the reaction temperature to rise above 50° C. after onset of the reaction or of foaming.

The reactants may, however, also be reacted by the known one-step process, prepolymer process or semi-prepolymer process, often using mechanical devices such as those described in U.S. Pat. No. 2,764,565. Details concerning apparatus which may also be used according to the invention have been described in Kunststoff-Handbuch, Volume VI, published by Vieweg and Hochtlen, Carl-Hanser-Verlag, Munich 1966, e.g., on pages 121 to 205.

Exceptionally high-grade plastics are obtained by the process according to the invention if hardening is carried out at temperatures above 20° C., in particular, 50° C.-200° C. So much heat is liberated even without the external supply of heat, especially in combinations of polyisocyanates which contain 10-40 percent of NCO groups. Temperatures above 150° C. are easily reached in the interior of foam blocks.

If the quantity of heat evolved in the reaction between the components is not sufficient, mixing may easily be carried out at a higher temperature, e.g., between 40° C. and 100° C. In special cases, mixing may also be carried out above 100° C., up to about 150° C. under pressure, so that when the material is discharged from the apparatus, the release of pressure is accompanied by foaming.

If production of the foam is carried out at an elevated temperature, one may, of course, also use higher boiling blowing agents such as hexane, dichloroethane, trichloroethane, carbon tetrachloride or light petrol. On the other hand, the water contained in the mixture may take over the function of blowing agent.

Foams may also be produced with the aid of inert gases, particularly air. For example, one of the reactants may be foamed up with air and then mixed with the other components. Mixing of the components may also be achieved, e.g., with the aid of compressed air which results in the direct formation of a foam which then hardens when shaped.

For any given formulation of components, the properties of the foams obtained, e.g., their density in the moist state, depends to some extent on the details of the mixing process such as the nature and speed of the stirrer, the form of the mixing chamber and the selected reaction temperature when foaming is started. This density may very from about 0.005 to 1.2 $g/m^3$ and in most cases moist fresh foams with densities of between 0.02 and 0.8 $g/cm^3$ are obtained. When dry, the foams may have an open-celled or closed-celled character.

The characteristics of the reaction mixtures provide many possible applications for the process according to the invention and hence many fields of application, some of which will be outlined below.

The reaction mixture which contains blowing agent may, for example, be spread-coated on warm or cold supports exposed to IR or HF radiation, or after passing the mixing apparatus the reaction mixture may be sprayed on these supports with the aid of compressed air or by the airless spraying process. The reaction mixture then foams up on the supports and hardens to form a filling or insulating or moisture-proofing coating. The foaming reaction mixture may also be forced, cast or injection-molded into cold or heated molds and in these molds, which may be relief molds, solid molds or hollow molds, it may be left to harden, optionally under pressure and at room temperature or temperatures of up to 200° C., optionally using a centrifugal casting process. At this stage, reinforcing elements in the form of inorganic and/or organic or metal wires, fibers, non-woven webs, foams, fabrics, supporting structures, etc., may be incorporated. This may be achieved, for example, by the fibrous web impregnation process or by processes in which the reaction mixtures and reinforcing fibers are together applied to the mold, for example, by means of a spray apparatus. The molded products obtainable in this way may be used as building elements, e.g., in the form of optionally foamed sandwich elements which may be used directly or subsequently laminated with metal, glass, plastics, etc., the good fire-retardant characteristics of the material in the moist or dry state being a considerable advantage in these elements. On the other hand, the products may be used as hollow bodies, e.g., as containers for goods which are required to be kept moist or cool, or they may be used as filter materials or exchangers, as catalyst carriers or carriers of other active substances, as decoration elements, furniture components and cavity fillings. They may also be used as heavy-duty lubricants and coolants or carriers of such substances, e.g., in metal extrusion presses. Their use in model and mold building and in the production of molds for metal casting may also be considered.

One preferred method consists of letting the foaming process proceed hand in hand with hardening, for example, by preparing the reaction mixture in a mixing chamber and at the same time adding the readily volatile blowing agent such as dichlorodifluoromethane, trichlorofluoromethane, butane, isobutylene or vinyl chloride so that with suitable choice of the mixing temperature, the reaction mixture foams up on leaving the mixing chamber due to evaporation of the blowing agent and at the same time, hardens due to the action of the hardener so that the resulting foam, which may still contain emulsifiers and foam stabilizers and other auxiliary agents, becomes fixed. Furthermore, the reaction mixture, which initially is still a thin liquid, may be foamed up by introducing gases such as air, methane, $CF_4$ or inert gases, optionally under pressure, this foam being converted into the required form and left to harden. Alternatively, the prepolymer solution which may contain foam stabilizers such as wetting agents, foam-forming agents, emulsifiers and, optionally, also other organic or inorganic fillers or diluents, may be converted into a foam by gasifying it and this foam may then be mixed with the counter components in a mixing apparatus and, optionally, also with hardener and then left to harden.

Instead of blowing agents, inorganic or organic finely divided hollow particles such as hollow expanded beads of plastics, straw and the like may be used for producing the foams.

The foams obtainable in this way may be used, optionally, after a compating or tempering process, optionally under pressure, as insulating materials, cavity fillings, packaging materials and building materials which have good solvent resistance and fire characteristics. They may also be used as light-weight building bricks in the form of sandwiches, e.g., with metal-covering layers for use in house-building and the construction of motor vehicles and aircarft.

The reaction mixtures may also be foamed up and hardened while in the form of droplets dispersed, e.g., in petroleum hydrocarbons or while they are under conditions of free fall. Foam beads are obtained in this way.

Furthermore, organic and/or inorganic particles which are capable of foaming or have already been foamed, e.g., particles of expanded clay, blown glass, wood, popcorn, cork, hollow beads of plastics such as vinyl chloride polymers, polyethylene, styrene polymers or foam particles of these polymers or of other polymers such as polysulphone, polyepoxide, polyurethane, urea formaldehyde, phenol formaldehyde or polyimide polymers may be incorporated in the forming reaction mixtures while they are still fluid, or heaps of these particles may be permeated with the reaction mixtures to produce insulating materials which have good fire-retardant characteristics.

If the blowing agent which is capable of evaporating or liberating gases below a given temperature, for example, a hydrocarbon or halogenated hydrocarbon, is added at this temperature to a mixture of aqueous silicate solutions and hardeners, optionally also containing inorganic and/or organic additives, then the resulting mixture, which is at first liquid, may be used not only for producing uniform foams or foams which contain other foamed or unfoamed fillers, but also for permeating woven and non-woven fibrous webs, grids, constructional parts or other permeable structures with foamed material to produce composite foams which have special properties, e.g., advantageous fire-retardant characteristics, which may be used directly as constructional elements in the building industry, furniture industry or motor vehicle and aircraft industries.

The foams according to the invention may also be added in a crumbly form to soil, optionally with the addition of fertilizers and plant-protective agents, to improve the agricultural consistency and plant-protective agents, to improve the agricultural consistency of the soil. Foams which have a high water content may be used as substrates for the propagation of seedlings, shoots and plants or for cut flowers. The mixtures may be sprayed on terrain which is impassible or too loose, such as dunes or marshes, to strengthen such terrain so that it will be firm enough to walk on within a short time and it will be protected against erosion.

The reaction mixtures proposed here are also important in the case of fire or disaster because they can be sprayed on articles which require protection, and the water contained in then cannot run down the surface of the protected article and cannot evaporate rapidly, wo that a very effective protection against fire, heat or radiation is obtained since the hardened mixture cannot be heated to temperature much above 100° C. so long as it still contains water, and it will absorb IR or nuclear radiation.

Since the mixtures can easily be sprayed, they can be used to form effective protective walls and protective layers in mines in the case of accident or also for routine work, for example, by spraying them on fabrics or other survaces or grids or also simply on walls.

In the same way, the foaming mixtures may also be used in underground and surface engineering and road building, for erecting walls and igloos and for sealing, filling, plastering, priming, insulating and decorating and as coatings, flooring compositions and linings. Their use as adhesives or mortar or casting compounds, optionally with inorganic or organic fillers, may also be considered. They may be charged with active substances or used as catalyst carriers or filters or absorbents.

Auxiliary agents which may be added to the reaction mixtur or introduced subsequently, such as emulsifiers, deterfent raw materials, dispersing agents, wetting agents, perfumes or substances which render the mixture hydrophobic enable the properties of foams to be modified as desired.

On the other hand, the foams may subsequently be lacquered, metallized, coated, laminated, galvanized, vapor-treated, bonded or flocked. Forming operations may be carried out on the shaped articles in their aqueous or dried state, for example, by sawing, cutting, drilling, planing, polishing or other such processes.

The shaped products, with or without filler, may be further modified in their properties by thermal after-treatment, oxidation processes, heat-pressing, sintering processor or surface melting or other compacting processes.

The molds may suitably be made of inorganic and/or organic foamed or unfoamed material such as metals, e.g., iron, nickel, refined steel or lacquered or teflon-coated aluminum or porcelain, glass, gypsum, cement, wood or plastics such as PVC, polyethylene, epoxy resins, polyurethanes, ABS, polycarbonate, etc.

The foams obtained according to the invention may also be subsequently rinsed or impregnated with aqueous or non-aqueous acid, neutral or basic liquids or gases such as hydrochloric acid, phosphoric acid, formic acid, acetic acid, ammonia, amines, organic or inorganic salt solutions, lacquer solutions, solutions of monomers which have been polymerized or are yet to be polymerized, dye solutions, galvanization baths or solutions with catalysts or catalyst precursors or perfumes.

The new composite plastics are also suitable for use as constructional materials because they have a high tensile strength and compression resistance and are tough and stiff and yet elastic and have a high dimensional stability under heat and flame resistance.

The excellent heat-insulating and sound-absorbing capacity of these foams should also be emphasized, properties which, in combination with the excellent fire resistance and heat resistance, open up new possibilities of application in the insulating field.

Thus, for example, high-quality light-weight building panels can be produced, either by cutting or sawing continuously foamed blocks or by foaming such panels in molds, optionally under pressure, this molding process being particularly suitable also for complicated shapes. By suitably controlling the operating conditions, it is also possible to obtain molded products which have a dense outer skin.

The process, according to the invention, is particularly suitable, however, for in situ foaming on the building site. Any hollow molds normally produced by shuttering in forms can be obtained by casting and foaming.

Cavities, joints and cracks can also easily be filled with the reaction mixture, a very firm bond being obtained between the materials which are joined together in this way. The reaction mixtures may also be used to produce insulating indoor plasters simply by spraying.

In many cases, the materials obtained can be used instead of wood or hard fiber board. They can be worked by sawing, grinding, planing, nailing, drilling and cutting and are, therefore, versatile in their uses and possible applications.

Very brittle light-weight foams which can be obtained, e.g., with very high silicate contents or by using combinations with brittle organo-polymers, can easily be crushed in suitable apparatus to form dust-fine powders which can be used for many purposes as organo-modified silica fillers. The organo-modification insures good surface interaction with polymers and in some cases, also a certain surface thermoplasticity which enables high-quality molding materials to be obtained with which top chemical surfaces reactions can be carried out by the addition of crosslinking agents.

For many purposes, additional fillers in the form of particulate or pulverulent materials are incorporated in the mixtures of polyisocyanate and organic component.

The fillers may be solid inorganic or organic substances used, e.g., in the form of powder, granulate, wire, fibers, dumb-bell-shaped particles, crystallites, spirals, rods, beads, hollow beads, foam-particles, fleeces, woven or knitted fabrics, tapes, foil pieces, etc., for example, dolomite, chalk, clay, asbestos, basic silicic acids, sand, talcum, iron oxide, aluminum oxide and hydroxides, alkali metal silicates, zeolites, mixed silicates, calcium silicates, calcium sulphates, alumino silicates, cements, basalt wool or powder, glass fibers, carbon fibers, graphite, carbon black, Al-, Fe-, Cu- and Ag-powder, molybdenum sulphide, steel wool, bronze or copper fabrics, silicon powder, expanded clay particles, hollow glass beads, glass powder, lava and pumice particles, wood chips, wood meal, cork, cotton, straw, popcorn, coke and particles of filled or unfilled, foamed or unfoamed, stretched or unstretched organic polymers. Among the numerous suitable organic polymers, the following are mentioned as examples which may be used, e.g., as powders, granulates, foam particles, beads, hollow beads, particles which can be foamed, but have not yet been foamed, fibers, tapes, woven and non-woven webs, etc., polystrene polyethylene, polypropylene, polyacrylonitrile, polyacrylonitrile, polybutadiene, polyisoprene, polytetrafluoroethylene, aliphatic and aromatic polyesters, melamine, urea or phenol resins, polyacetal resins, polyepoxides, polyhydantoins, polyureas, polyethers, polyurethanes, polyimides, polyamides, polysulphones, polycarbonates and, of course, any copolymers thereof.

In principle, the composite materials according to the invention may be filled with considerable quantities of fillers without thereby losing their valuable properties. Composite material in which the inorganic component predominates are preferably filled with inorganic fillers to obtain a reinforcing effect while composite materials in which the silicate content predominates are preferably filled with organic fillers. Particularly preferred fillers are chalk, talcum, dolomite, gypsum, clay, anhydrite, glass, carbon and the usual plastics and rubber waste.

Products which have a low filler content are particularly suitable for producing rapidly hardening high-quality surface coatings which have excellent adherence and wear resistance and for producing elastomers with high strength and high modulus. The reactive mixture may be used for producing surface coatings, adhesive bonds, putties and interlayers.

For such applications, it is preferable to use polyisocyanates with a low isocyanate content, e.g., less than 5 percent. The mixtures obtained in this way have a long pot life and can also be applied in thin layers which gradually harden in the course of time.

The materials according to the invention are also suitable for use as finishes for treating fibers in impregnating agents. For this purpose they may be applied either as the finished mixture of organic component and silicate component or as two separate baths. It is, therefore, preferable first to apply that component which adheres more firmly to the fiber, in other words, the isocyanate component on organic material and the silicate component on inorganic material.

Furthermore, fibers and sheet structures which can be used, e.g., for manufacturing synthetic incombustible paper or for manufacturing non-woven webs may be produced by extruding the mixtures through dies or slots.

Any suitable modifying or additive compounds may be used in the reaction of this invention to vary properties of the product. Typical modifying compounds include polyepoxides, polysulfide polymers, alkali sulfides, aminoplasts, phenoplast, fatty or rosen acids, furfural-ketone resin, styrene oxide, cellulose, lignin, vegetable oil, melamine, urea, furan compounds, vinyl monomers with catalyst, vinyl polymers, aliphatic dienes, diene polymers, halogenated aliphatic and aromatic compounds, triallyl cyanurate, polyepichlorohydrin polymers, alkali metal phenols, polyester resins with catalyst, aldehydes, ketones, alkali metal silicates, aqueous alkali metal silicates, fumed silica, hydrated silica, polysilicic acid, perchloroethylene, benzoate esters, phthalate esters, polyester benzoate, water-binding agents, etc., and mixtures thereof.

The object of the present invention is to produce inorganic-organic polyols with free phosphorate acid radicals and salt of inorganic-organic polyols containing phosphorus by the process of this invention. Another object of this invention is to provide a process for the production of flame-retardant polyol emulsions containing phosphorus-containing salts.

Another object is to produce novel flame-retardant polyurethane products using small amounts of low-cost flame-retardant agents. Still another object is to produce flame-retardant polyurethane products that may be used for thermal insulation, structural purposes, sound proofing, shock-resistant packaging, cushions, surface coating, adhesives, casting material, putty, etc.

Any suitable epoxy catalyst may be used in this invention. The Lewis acids are preferred. The epoxy catalysts are commonly known in the Art. A typical list of Lewis acids may be found in U.S. Pat. No. 4,383,089 and is incorporated into this application. The preferred Lewis acid is $BF_3$. A catalytic amount of $BF_3$ is sufficient. Other Lewis acid may be used with the phosphorus acids, which are epoxy catalyst, to speed up or improve the polymerization process and product. Up to 10% by weight of other epoxy catalyst may be used with the phosphorus acids, percentages based on the reaction mixture.

Any suitable modifying or additive compounds may be used in the reaction of this invention to vary properties of the product. Typical modifying compounds include polysulfide polymers, aminoplasts, phenoplast, fatty or rosen acids, furfural-ketone resin, cellulose, wood powder, vegetable oil, melamine, urea, furan compounds, vinyl monomers with catalyst, vinyl polymers, aliphatic dienes, diene polymers, halogenated aliphatic and aromatic compounds, triallyl cyanurate, polyester resins with catalyst, aldehydes, ketones, fumed silica, hydrated silica, polysilicic acid, perchloroethylene, benzoate esters, phthalate esters, polyester benzoate, etc., and mixtures thereof.

DESCRIPTION OF PREFERRED EMBODIMENTS

My invention will be illustrated in greater detail by the specific examples which follow, it being understood that these preferred embodiments are illustrative of, but not limited to, procedures which may be used in the production of Flame-retardant polyols and flame-retardant polyurethane products. Parts and percentages are by weight unless otherwise indicated.

EXAMPLE 1

About 15 parts by weight of an aqueous solution containing 50 percent phosphoric acid and 85 parts by weight of epichlorohydrin are mixed and reacted. The reaction is exothermic. Agitation and cooling are necessary. The reaction is completed in 1 to 12 hours to produce a poly(epichlorohydrin)phosphorate with free acid radicals. Then 30 parts by weight of finely powdered (pass thru a 200-mesh screen) calcium carbonate are added and thoroughly mixed. Carbon dioxide is released and the reacting is complete in 1 to 12 hours, thereby producing an inorganic-organic polyol (calcium salt of polyepichlorohydrin phosphate) and calcium phosphate emulsion.

EXAMPLE 2

Example 1 is modified wherein a basic salt-forming compound is used in place of calcium carbonate and selected from the list below:
(a) sodium hydroxide;
(b) potassium carbonate;
(c) potassium hydroxide;
(d) calcium carbonate;
(e) calcium hydroxide;
(f) potassium acetate;
(g) sodium adipate;
(h) Portland cement;
(i) talc;
(j) Wollastonite (calcium silicate);
(k) clay;
(l) asbestos;
(m) mica;
(n) kaolin;
(o) natural zeolite;
(p) lithium carbonate;
(q) sodium silicate;
(r) potassium silicate;
(s) lithium silicate;
(t) zinc hydroxide;
(u) lead acetate;
(v) nickel carbonate;
(w) tin hydroxide;
(x) sodium borate;
(y) calcium oxide;
(z) mixtures of the above.

EXAMPLE 3

Example 1 is modified wherein a compound containing at least one reactive hydrogen is selected from the list below, added with Components A, B and D, and used in place of propylene glycol:
(a) ethylene glycol;
(b) diethylene glycol;
(c) dipropylene glycol;
(d) triethylene glycol;
(e) butylene-1,4-glycol;
(f) hexane-1,6-diol;
(g) octane-1,8-diol;
(h) neopentyl glycol;
(i) glycerol;
(j) thimethylol;
(k) pentaerythritol;
(l) quinitol;
(m) methyl glycoside;
(n) castor oil;
(o) dibutylene glycol;
(p) polyester polyol;
(q) polypropylene triol, mol. wt. 3,000. hydroxyl No. 56;
(r) poly(oxyalkylene)triol, mol. wt. 3,000, hydroxyl No. 58;
(s) sucrose amine polyol, hydroxyl No. 350;
(t) polypropylene polyol, hydroxyl No. 380;
(u) aromatic polyester polyol, hydroxyl No. 350;
(v) phenyl amine polyol, hydroxyl No. 380;
(w) sucrose polyol, hydroxyl No. 340;
(x) mixtures of the above.

EXAMPLE 4

Example 1 is modified wherein another phosphorus-containing compound is used in place of phosphoric acid and is selected from the list below:
(a) hypophosphorus acid;
(b) phosphinic acid;
(c) phosphonous acid;
(d) phosphoris oxychloride;
(e) triphosphoric acid;
(f) phosphorus trichloride;
(g) pyrophosphoric acid.

EXAMPLE 5

Example 1 is modified wherein a modifying compound is selected from the list below in the amount of 25 parts by weight:
(a) styrene;
(b) methyl styrene liquid polymer;
(c) phenol-formaldehyde liquid acid polymerized;
(d) urea-formaldehyde powder;
(e) methyl methacrylate liquid polymer;
(f) polyamide liquid polymer;
(g) unsaturated polyester resin;
(h) ethylene-vinylacetate polymer powder;
(i) acrylonitrile monomer;
(j) melamine-formaldehyde resin powder;
(k) isoprene;
(l) chloroprene;
(m) wood powder;
(n) furfural-ketone liquid resin;
(o) polysulfide liquid polymer;
(p) furfural;
(q) acetone;
(r) polysilicic acid;
(s) triallyl cyanurate;
(t) benzyl aldehyde;
(u) and mixtures thereof.

EXAMPLE 6

Example 1 is modified wherein a catalytic amount of $BF_3$ is added to the mixture and another epoxy compound selected from the list below is used in place of epichlorohydrin:
(a) propylene oxide;
(b) butylene oxide;
(c) tetrahydrofuran;
(d) styrene oxide;
(e) ethylene oxide, in a closed system under pressure of 50 to 100 psi.

EXAMPLE 7

Example 1 is modified wherein a catalytic amount of $BF_3$ is added to the mixture and 25% of the epichlorohydrin is replaced with the epoxide selected below and reacted in a closed system:
(a) propylene oxide;
(b) butylene oxide;
(c) tetrahydrofuran;
(d) styrene oxide;
(e) ethylene oxide, slowly added under pressure of 50 to 100 psi;
(f) trichlorobutylene oxide.

EXAMPLE 8

About 10 parts by weight of a concentrated phosphoric acid 80 parts by weight of propylene oxide and 10 parts by weight of glycerol are added in a closed system while agitating and cooling for 1 to 4 hours until the reaction is complete; then 100 parts by weight of a finely powdered talc (passes thru a 200-mesh screen) is added. The mixture is agitated and a gas is released. The reaction is complete in 1 to 4 hours, thereby producing an inorganic-organic polysol (magnesium propylene polyether phosphate polyol) and salt (magnesium phosphate) emulsion.

EXAMPLE 9

Example 8 is modified wherein a catalytic amount of $BF_3$ is added to the propylene oxide and 10 parts by weight of ethylene oxide are slowly added to the reacting mixture.

EXAMPLE 10

Example 8 is modified wherein another compound which has at least 1 active hydrogen is used in place of glycerol

EXAMPLE 10

Example 8 is modified wherein another compound which has at least 1 active hydrogen is used in place of glycerol and selected from the list below and a catalytic amount of $BF_3$ is added to the mixture:
(a) water;
(b) ethanol;
(c) methanol;
(d) ethylene glycol;
(e) propylene glycol;
(f) trimethyolpropane;
(g) aniline;
(h) phenol;
(i) ethylene dramine;
(j) sucrose;
(k) ethanolamine;
(l) 4,4'-dihydroxy-diphenylpropane;
(m) phthalic acid;
(n) acetic acid;
(o) polybutadienes which contain OH groups;
(p) thiodiglycol;
(q) phenoplast;
(r) aminoplast;
(s) starch;
(t) urea;
(u) tolylene diamine;
(v) diethylene glycol;
(w) mixture of the above;

EXAMPLE 11

Example 8 is modified wherein another phosphorus-containing compound is used in place of phosphoric acid, selected from the list below, and a catalytic amount of $BF_3$ is added to the mixture:
(a) phosphinic acid;
(b) phosphinous acid;
(c) phosphine oxide;
(d) phosphorus trichloride;
(e) alkylchlorophosphine;
(f) phenylacid phosphate;
(g) phosphorus oxychloride;
(g) sodium dihydrogen phosphorate;
(i) mixtures of the above.

EXAMPLE 12

Example 8 is modified wherein another alkali salt-forming compound is used in place of talc and selected from the list below:
(a) sodium hydroxide;
(b) sodium carbonate;
(c) sodium acetate;
(d) sodium adepate;
(e) potassium hydroxide;
(f) potassium carbonate;
(g) sodium bicarbonate;
(h) potassium acetate;
(i) lithium hydroxide;
(j) lithium carbonate;
(k) ammonium carbonate;
(l) ammonium acetate;
(m) mixtures of the above.

EXAMPLE 13

Example 8 is modified wherein 10 parts by weight of an epoxy compound selected from the list below and a catalytic amount of $BF_3$ are added to the mixture:
(a) epichlorohydrin;
(b) epibromohydrin;
(c) methyl epichlorohydrin;
(d) glycidol;
(e) 1,2-epoxybutane;
(f) epoxidized phenol-formaldehyde resin;
(g) epoxidized Bisphenol A;
(h) ethylene oxide;
(i) butylene oxide;
(j) trichlorobutylene oxide;
(k) tetrahydrofuran;
(l) styrene oxide;
(m) mixtures of the above.

EXAMPLE 14

Example 8 is modified wherein a catalytic amount of a Lewis acid is selected from the group below and added to the mixture:
(a) boron trichloride;
(b) aluminum chloride;
(c) zinc chloride;
(d) tin tetrachloride;
(e) arsenic trichloride;
(f) magnesium chloride;
(g) magnesium bromide;
(h) manganous chloride;
(i) cupric bromide;
(j) ceric chloride;
(k) arsenic tri-iodide;
(l) antimony pentachloride;
(m) strontium bromide;
(n) chromic bromide;
(o) chorium chloride;
(p) boron trifluoride;
(q) monochloro-acetic acid;
(r) trichloroacetic acid;
(s) sulfuric acid;
(t) hydrochloric acid;
(u) 2,4-dichlorobenzoic acid;
(v) 4chloro-2-nitrobenzene phosphonic acid.

EXAMPLE 15

About 30 parts by weight of the polyol produced in Example 1 (calcium salt of polyepichlorohydrin phosphate and calcium phosphate emulsion), 0.5 parts by weight of foam regulator (DOW 190), 0.25 parts by weight of tin octoate and 0.5 parts by weight of triethylamine are mixed, then 35 parts by weight of polymeric MDI (MONDUR MR by MOBAY) and 5 parts by weight of trichloromonofluoromethane are added and thoroughly mixed. The mixture expands to produce a rigid, tough, polyurethane foam of about 2 pounds.

The foam was flame-tested with a ½-inch flame from a propane torch. The foam is self-extenguishing within 5 seconds after the flame is removed.

EXAMPLE 16

Example 15 is modified wherein another polyisocyanate is used in place of Polymeric MDI (MONDUR MR by MOBAY) and selected from the group below:
(a) Polymeric MDI (PAP 127 by UPJOHN);
(b) tolylene diisocyanate (TDI by OLIN);
(c) modified polyisocyanate (MONDUR T-422 by MOBAY);
(d) methylene diphenyl isocyanate;
(e) hexamethylene-1,6-diisocyanate.

EXAMPLE 17

Example 15 is modified wherein 1 part by weight of a cross-linking polyol is selected from the group listed below:
(a) ethylene glycol;
(b) propylene glycol;
(c) glycerol;
(d) diethylene glyol;
(e) ethylene diamine;
(f) castor oil.

EXAMPLE 18

About 30 parts by weight of the magnesium salt of propylene polyether phosphate polyol and magnesium phosphate emulsion as produced in Example 8 and 20 parts by weight of polymeric MDI (MONDUR MR by UPJOHN) are mixed and reacted, thereby producing a solid flame-retardant polyurethane product.

EXAMPLE 19

Example 18 is modified wherein 0.5 parts by weight of a foam regulator (DOW 190), 0.5 part by weight of an amine catalyst (DABCO R-8020), 0.25 parts by weight of stanous octoate and 5 parts by weight of trichloromonofluoromethane are added to the emulsion, thereby producing a semi-flexible flame-retardant polyurethane foam of about 1.5 lb./cu. ft.

EXAMPLE 20

Example 15 is modified wherein the polyol produced in Example 1 is selected from the organic oxides of Example 6a, and propylene oxide, and a calcium polypropylene phosphorate polyol are used.

EXAMPLE 21

About 20 parts by weight of the poly(epichlorohydrin)phosphorate, with free acid radicals and with the water removed by vacuum distillation, are mixed and reacted with 24 parts by weight of polymeric MDI (PAPI 27 by UPJOHN). The mixture solidifies into a solid flame-retardanrt polyurethane product.

EXAMPLE 22

About 20 parts by weight of the poly(epichlorohydrin)phosphate with free acid radicals, 3 parts by weight of trichloromonofluoromethane, 0.5 parts by weight of a foam regulator (DOW 190), 0.5 parts by weight of an amine catalyst (DABCO R-8020 by AIR PRODUCTS), 0.25 parts by weight of organic tin catalyst (tin octoate) and 22 parts by weight of polymeric MDI (MONDUR MR by MOBAY) are thoroughly mixed. The mixture expands into a rigid flame-retardant polyurethane foam of about 2 lb./cu.ft. The foam is self-extinguishing.

EXAMPLE 23

Example 20 is modified wherein 50% of the polymeric MDI (MONDUR MR. by MOBAY) is replaced with a polyisocyanate taken from the list below:
(a) tolylene diisocyanate (TDI by OLEN);
(b) polymeric MDI (PAPI 27 by UPJOHN);
(c) methylene diphenyl isocyanate;
(d) modified polyisocyanate (MONDUR T-422 by MOBAY);
(e) hexamethylene-1,6-diisocyanate.

EXAMPLE 24

Example 1 is modified wherein a polymerizable unsaturated compound, selected from the group below, is added to the reactive mixture:
(a) styrene;
(b) acrylonitrile;
(c) acrylic acid;
(d) methacrylic acid;
(e) isoprene;
(f) methyl styrene;
(g) allyl chloride;
(h) allyl alcohol;
(i) methyl methacrylate;
(j) chloroprene.

A catalytic amount of a free-radical initiator may be added to the mixture.

EXAMPLE 25

About 15 parts by weight of aqueous phosphoric acid containing 50% phosphoric acid, 85 parts by weight of epichlorohydrin and 30 parts by weight of basic salt-forming compound in the form of a fine powder which passes thru a 200-mesh screen and is selected from the group below, are added simultaneously to a closed system. The reaction is exothermic and is complete in 1 to 4 hours, thereby producing in liquid form a salt of poly(epichlorohydrin)phosphate polyol and a phosphate salt-polyol emulsion:
(a) talc;
(b) Wollastonite;
(c) Kaolin;
(d) clay;
(e) mica;
(f) natural zeolite;
(g) sodium silicate glass;
(h) asbestos;
(i) magnesium silicate;
(j) felspar;
(k) benitorte;
(l) calamine;
(m) aluminum;
(n) urea;
(o) melamine;
(p) ammonium acetate;
(q) monticelite (MgCaSiO$_4$);
(r) microline;
(s) tin carbonate;
(t) nickel carbonate;

(u) antimony;
(v) titanium oxide;
(w) iron oxide;
(x) dicyandiamide;
(y) guanidine;
(z) mixtures thereof.

EXAMPLE 26

Example 25 is modified wherein 25% of the epichlorohydrin is replaced with an epoxy compound selected from the list below:
(a) propylene oxide;
(b) ethylene oxide under pressure;
(c) trichlorobutylene oxide;
(d) styrene oxide;
(e) butylene oxide;
(f) tetrahydrofuran.

EXAMPLE 27

Example 25 is modified wherein propylene oxide is used in place of epichlorohydrin.

EXAMPLE 28

Example 1 is modified wherein another epihalohydrin is used in place of epichlorohydrin and has the general formula of

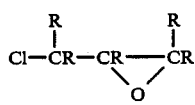

where R is the same or different organic radicals as hydrogen. The R group may, for example, be $CH_3$—, $C_2H_5$—, $C_3H_7$—, $C_5H_4$—, $C_5H_{17}$—, $C_{10}H_{21}$—, phenyl, tolyl, xylyl, pyridyl, furyl, etc.

EXAMPLE 29

Example 1 is modified wherein calcium carbonate is replaced with 5 parts by weight of an amine compound selected from the list below:
(a) dithyleneamine;
(b) ethyl ene amine;
(c) propylene amine;
(d) diethylenetriamine;
(e) triethylenediamine;
(f) triethyleneamine;
(g) hexamethylenediamine;
(h) 1,4-diaminocyclohexane;
(i) N(hydro-propyl)diethylenetriamine;
(j) dimethylamine;
(k) dibenzylamine;
(l) cyanoethylated diethylenetriamine;
(m) N(3-ethylthio-2-hydropyl)diethylenetriamine;
(n) salt of diethylenetriamine and stearic acid;
(o) di(amino-ethyl)benzene;
(p) triethoxy silylpropylamine;
(q) ethanolamine;
(r) dimethyl ethyl amine;
(s) dimethylethanol amine;
(t) 1,8-Diaza Bicyclo 5,4,0 Undecene 7:
(u) tributylamine;
(v) triisopropanolamine;
(w) N-methyl-diethanolamine;
(x) N,N-dimethyl-ethanolamine;
(y) N-ethyl-diethanolamine;
(z) mixtures of the above.

EXAMPLE 30

About 20 parts by weight of the polyol produced by Example 29, ethanolamine-polyepichlorohydrin phosphate polyol, 0.25 parts by weight of a foam regulator (DOW 193), 0.5 parts by weight of tertiary amine DABCO IV 33 by AIR PRODUCTS) and 22 parts by weight of polymeric MDI (MONDUR MR by MOBAY) are thoroughly mixed. The mixture expands into a rigid tough polyurethane foam of about 2 lbs./cu. ft. The foam is self-extinguishing.

EXAMPLE 31

About 10 parts by weight of the polyepichlorohydrin phosphate polyol with free acid radical as produced in Example 1, 20 parts by weight of polypropylene triol hydroxyl No. 56, Mol. wt. 3,000, 0.25 parts by weight of tin octoate, 0.5 parts by weight of a foam stabilizer (DOW 190) and 0.5 parts by weight of an amine catalyst (DABCO R-8020) are mixed. The amine catalyst reacts with the acid radicals of the polyepichlorohydrin phosphate polyol. Then 18 parts by weight of tolylene diisocyanate (TDI by Olin) are added to the mixture and thoroughly mixed. The mixed expands, then solidifies to produce a flexible polyurethane foam of about 1.5 lbs./cu.ft. which is self-extinguishing.

EXAMPLE 12

About 10 parts by weight of the polyepichlorohydrin phosphate polyol with free acid radicals, 20 parts by weight of sucrose amine polyol (POLY 71-530 by Olin) and 0.5 parts by weight of a foam regulator (DOW 193) are mixed. The amine radical reacts with the free acid, then 35 parts by weight of polymeric MDI (PAPI 27 by UPJOHN) are added and thoroughly mixed. The mixture expands and hardens to produce a rigid polyurethane foam of about 2 lbs./cu. ft. The foam is self-extinguishing.

EXAMPLE 33

Example 27 is modified wherein another amine polyol is used in place of the sucrose amine polyol and selected from the list below:
(a) aromatic amine polyol-hydroxyl No. 530;
(b) amine polyol-hydroxyl No. 475;
(c) Phenylamine polyol-hydroxyl No. 350;
(d) amine polyol-hydroxyl No. 470;
(e) Sucrose amine polyol-hydroxy No. 690.

Although specific materials and conditions were set forth in the above examples, these were merely illustrative of preferred embodiments of my invention. Various other compositions, such as the typical materials listed above, may be used where suitable. The reactive mixtures and products of my invention may have other agents added thereto to enhance or otherwise modify the reaction and products.

Other modifications of my invention will occur to those skilled in the Art upon reading my disclosure. These are intended to be included within the scope of my invention, as defined in the appended claims.

I claim:

1. The process for the production of flame-retardant polyurethane foam which consists of mixing and reacting the following components:
Component A: epoxy compound, in the amount of 100 parts by weight;

Component B: compound containing 1 or more reactive hydrogens, in the amount of up to 100 parts by weight;

Component C: acidic salt-forming compound that contains phosphorus, in the amount of 1 to 30 parts by weight;

Component D: basic salt-forming compound that will react with a phosphorus-containing compound, in the amount of up to 100 parts by weight;

Component E: compound containing at least two isocyanate radicals, in the amount of 25 to 200 parts by weight;

Component F: up to 50 percent by weight of a blowing agent consisting of an inert liquid, boiling in the range of $-25°$ C. to $80°$ C. is included in the reactive mixture;

the said mixing carried out in such a way that Components A, B and C are reacted, thereby producing an inorganic-organic polyol with acidic phosphate radicals, then component D is added and reacted, thereby producing a salt of inorganic-organic polyol containing phosphorus and a salt-containing phosphorus, then Component E and and F are added.

2. The process of claim 1 wherein Component A is selected from the group consisting of ethylene oxide, propylene oxide, epihalohydrin, butylene oxide, tetrahydrofuran, styrene oxide, polyepoxy compounds and mixtures thereof.

3. The process of claim 1 wherein Component C is selected from the group consisting of phosphoric acid, phosphinic acid, phosphonic acid, phosphonous acid, phosphinous acid, phosphine oxide, phosphorus trichloride, alkylchlorophines, organic acid phosphates, phosphorus oxychloride, monoaluminum phosphate, hydrogen-containing salts of phosphoric acid, hypophosphorus acid and mixtures thereof.

4. The process of claim 1 wherein Component B is selected from the group consisting of alcohols, polyalcohols, amines, water, surcose, dextrose, sorbitol, methyl glucoside, carbohydrates and mixtures thereof.

5. The process of claim 1, in regards to Component D, wherein the basic salt-forming compound is selected from the group consisting of alkali metal compounds, alkaline earth metal compounds, metal compounds, ammonia compounds, amines, amino compounds and mixtures thereof.

6. The process of claim 1 wherein up to 300 percent by weight of a modifying compound is added to the reaction mixture.

7. The process of claim 1 wherein up to 20 percent by weight of emulsifying agent is included in the reactive mixture.

8. The process of claim 1 wherein up to 10 percent by weight of an epoxy catalyst is included in the reactive mixture of Components A, B and C.

9. The process of claim 1 wherein up to 10 percent by weight of polyurethane activator is included in the reaction mixture.

10. The process of claim 1 wherein up to 20 percent by weight of a foam stabilizer is included in the reaction mixture.

11. The process of claim 1 wherein inorganic or organic particulate or pulverulent material is included in the reaction mixture.

12. The process of claim 1 wherein the compound containing at least two isocyanate radicals is selected from the group consisting of aliphatic, cycloaliphatic, araliphatic, aromatic and heterocyclic polyisocyanates and mixtures thereof.

13. The process of claim 1 wherein 1 to 200 parts by weight of a compound containing at least two isocyanate radicals are mixed in place of Component E and reacted with 1 to 50 parts by weight of the inorganic-organic polyol with acid phosphate radical before Component D is added thereby producing a foamed polyurethane product.

14. The process of claim 1 wherein the Components are mixed simultaneously.

15. The process of claim 1 wherein water is used as the blowing agent.

16. The process of claim 1 wherein the water is chemically bound to a flame-retardant agent is used as the blowing agent.

* * * * *